Oct. 8, 1957 V. S. DANIELSON 2,808,945
SHOCK ABSORBING MECHANISMS
Filed Nov. 5, 1953 2 Sheets-Sheet 1

Inventor:
Vernon S. Danielson.
By Henry Fuchs
Atty.

Oct. 8, 1957  V. S. DANIELSON  2,808,945
SHOCK ABSORBING MECHANISMS
Filed Nov. 5, 1953  2 Sheets-Sheet 2

Inventor:
Vernon S. Danielson
By Henry Fuchs
Atty.

United States Patent Office 2,808,945  
Patented Oct. 8, 1957

2,808,945

SHOCK ABSORBING MECHANISMS

Vernon S. Danielson, Chicago, Ill., assignor to W. H. Miner, Inc., Chicago, Ill., a corporation of Delaware Application November 5, 1953, Serial No. 390,312

3 Claims. (Cl. 213—22)

This invention relates to improvements in shock absorbing mechanisms for railway draft riggings.

One object of the invention is to provide a shock absorbing mechanism of high capacity, comprising a friction casing, friction shoes slidingly telescoped within the casing, and rubber cushioning means within the casing yieldingly opposing inward movement of the shoes, wherein the shoes are held in frictional contact with the interior walls of the casing by rubber pressure transmitting means which is under initial compression.

Another object of the invention is to provide a friction shock absorbing mechanism comprising a friction casing having interior friction surfaces, opposed friction shoes telescoped within the casing in sliding frictional engagement with the friction surfaces of the same, and rubber cushioning means within the casing yieldingly opposing inward movement of the shoes, and means interposed between the shoes for pressing the same against the friction surfaces of the casing, comprising a pair of rubber mats bearing on the inner sides of the shoes, and an expanded plug between the pads for holding the latter compressed against the shoes.

A more specific object of the invention is to provide a mechanism as set forth in the preceding paragraph, wherein the expanded rubber plug comprises a pair of wedge plates and a wedge block engaged between the plates for maintaining the same spread apart.

Other objects of the invention will more clearly appear from the description and claims hereinafter following.

In the accompanying drawings forming a part of this specification, Figure 1 is a front elevation view of my improved mechanism.

Figure 1:
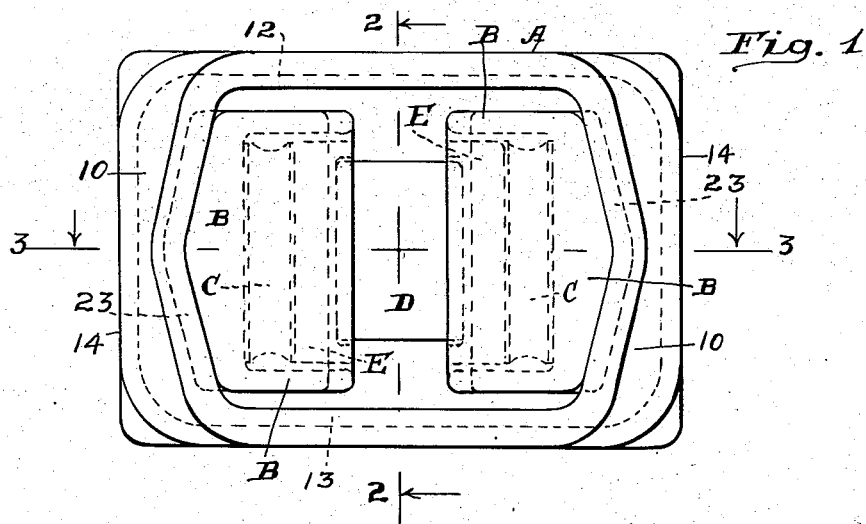

My improved shock absorbing mechanism as illustrated in the drawings, comprises broadly a casing A, a pair of friction shoes B—B, a pair of rubber elements C—C, a wedge D, a pair of wedge plates E—E, and a plurality of rubber cushioning units F—F and follower plates G, H, K, and L, together forming a yielding column disposed within the friction casing A, and yieldingly opposing inward movement of the shoes.

Figure 3:
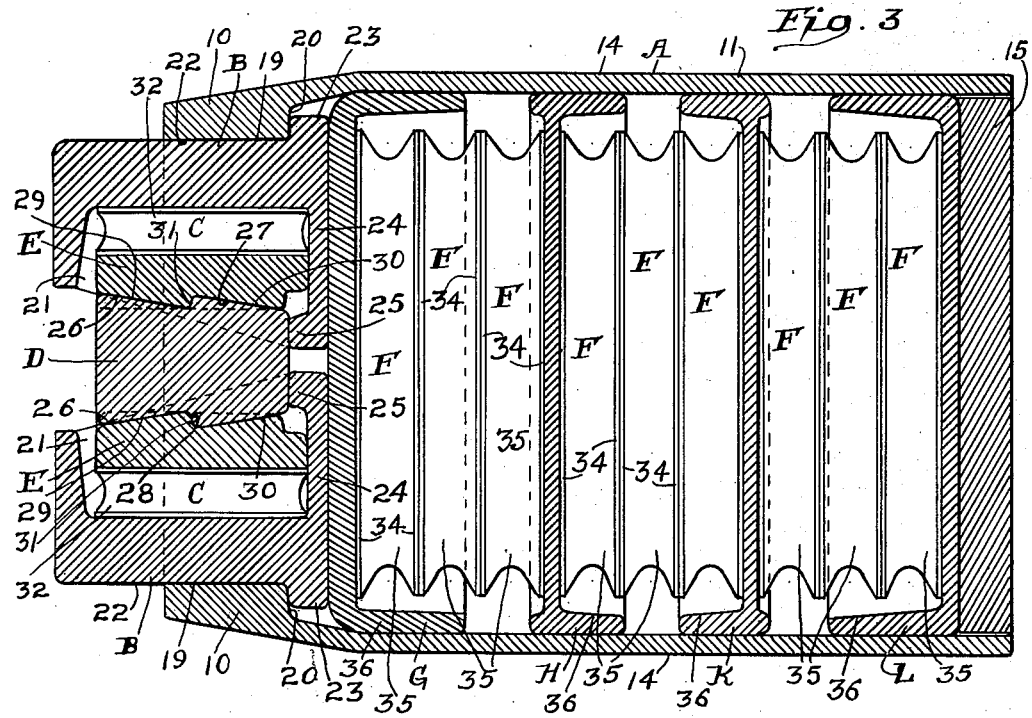
Figure 3 is a horizontal sectional view, corresponding substantially to the line 3—3 of Figure 1, with the rubber cushioning units shown in top plan.
Figure 4:
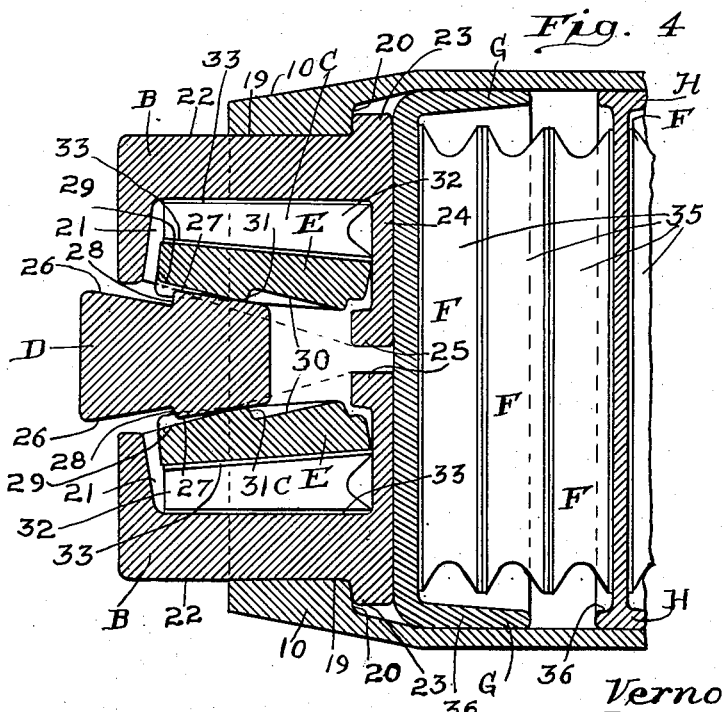
Figure 4 is a view similar to Figure 3 of the front end portion of the mechanism, illustrating part of the assembling operation.

The friction casing A is in the form of a hollow, tubular member of substantially rectangular cross section, having a friction shell section 10 at the forward end. The portion of the casing rearwardly of the friction shell sections 10 provides a cage 11 for the yielding cushioning means of the mechanism hereinafter described. The casing A, which is rectangular, as hereinbefore stated, has vertically spaced, longitudinally extending, top and bottom walls 12 and 13, and laterally spaced, vertical side walls 14—14. The casing A is closed at its rear end by a transverse wall 15 in the form of a thick plate, having top and bottom retaining flanges 16—16, engaged in back of inturned flanges 17—17 on the walls 12 and 13 of the cage 11 of the casing. The top and bottom walls 12 and 13 of the cage 11 are provided with interior, lengthwise extending, top and bottom guides 18—18 formed by inwardly offset portions on said top and bottom walls. The walls of the casing A at the friction shell section 10 thereof are thickened, as shown, the inner surfaces of the top and bottom walls thereof being continuous and in alignment with the guides 18—18 of the cage 11. The side walls of the friction shell section 10 present opposed, interior, longitudinally extending friction surfaces 19—19 of V-shaped, transverse cross section, which are offset laterally inwardly with respect to the inner surfaces of the side walls 14—14 of the cage 11, as shown in Figures 3 and 4, thus providing rearwardly facing stop shoulders 20—20 at opposite sides of the inner or rear end of the friction shell section 10.

The friction shoes B—B are in the form of hollow blocks, recessed on their inner sides to provide laterally opening, rectangular pockets 21—21 in which are accommodated the rubber elements C—C and the wedge plates E—E. On its outer side, each shoe B has a lengthwise extending, V-shaped friction surface 22, which has sliding engagement with the friction surface 19 at the corresponding side of the mechanism. At the rear end of each shoe B, that is, at the inner end of the friction surface 22 thereof is provided a laterally projecting stop flange 23 which engages in back of the shoulder 20 at the corresponding side of the friction shell of the casing A to restrict outward movement of said shoe. The shoes B—B project outwardly beyond the front end of the casing, as shown in Figure 1, and receive the actuating force, being engaged by the usual front follower of the railway draft rigging when employed as a draft gear. The opposed inner sides of the shoes B—B converge rearwardly of the mechanism, as shown most clearly in Figure 3, and the transverse vertical rear end wall of the pocket of each shoe, which wall is designated by 24, is thus somewhat longer than the front wall of said pocket. The wall 24 has a right angular flange 25, at its outer end, which projects forwardly from said wall.

The wedge D is in the form of a block having front and rear sets of rearwardly converging side wedge faces 26—27 and 26—27 with forwardly facing, transverse abutment shoulders 28—28 therebetween. The wedge D is disposed centrally of the mechanism, between the shoes B—B and has its rear end, which is flat, bearing on the front edges of the flanges 25—25 of the shoes B—B.

The wedge plates E—E are disposed at opposite sides of the wedge D within the pockets 21—21 of the shoes B—B. Each wedge plate E has a set of front and rear wedge faces 29 and 30 on its inner side, correspondingly inclined to and engaged by the corresponding wedge faces 26 and 27 of the wedge D. Between the wedge faces 29 and 30, each plate E presents a rearwardly facing, transverse abutment shoulder 31, which engages the shoulder 28 at the corresponding side of the wedge D to lock the wedge against forward movement with respect to said shoe.

The rubber elements C—C are similar in design, each comprising a rectangular rubber pad or mat 32 and two metal plates 33—33 between which the mat is interposed and to which it is bonded. The rubber elements C—C are located at opposite sides of the mechanism, within the pockets 21—21 of the shoes B—B, being interposed between said shoes B—B and the wedge plates E—E at said pockets.

Figure 2:
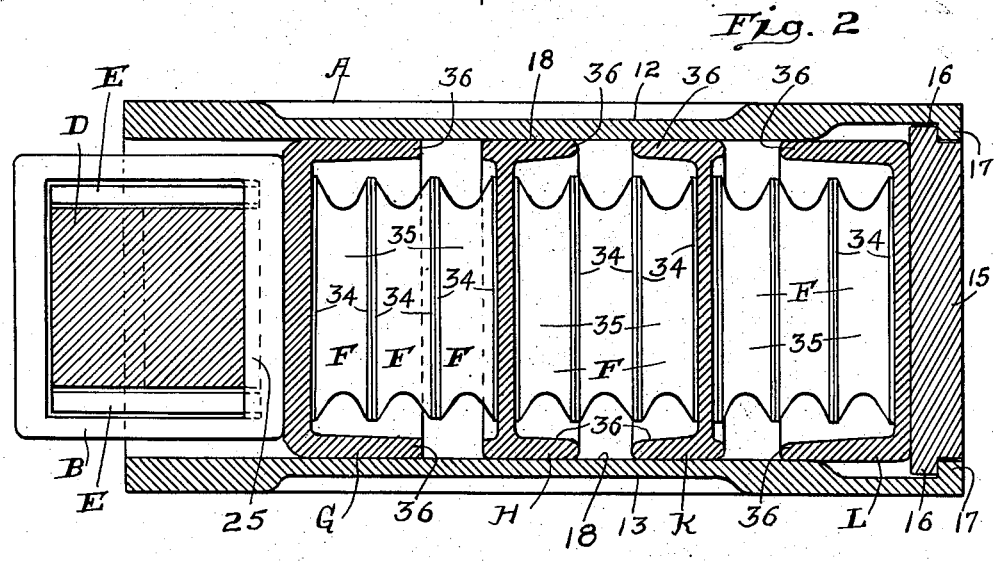
Figure 2 is a longitudinal, vertical sectional view of my improved mechanism, corresponding substantially to the line 2—2 of Figure 1, showing the rubber cushioning units in elevation.

In the assembled mechanism, as shown in Figures 2 and 3, the rubber elements C—C are under initial compression, being maintained in that condition by the wedge D and the wedge plates E—E, which together form an expanded plug acting on the rubber elements C—C, through the spreading action of the wedge D on the wedge plates E—E, to hold said rubber elements C—C compressed against the shoes B—B and the latter in tight frictional engagement with the friction surfaces 19—19 of the casing A.

The rubber units F—F are arranged within the cage 11 of the casing A in back of the shoes B—B in column formation, the same being divided into three groups, that is, front, rear, and intermediate groups, of three units each, as shown in Figures 2 and 3, each unit F being composed of a pair of rectangular metal plates 34—34 and an interposed, rectangular rubber pad or mat 35, bonded to said plates.

The follower plates G, H, K, and L are all of rectangular shape in transverse cross section and slidingly fit between the top and bottom guides 18—18 and the side walls 14—14 of the cage 11 of the casing A. The follower plate G is interposed between the rear ends of the shoes B—B and the front group of rubber units F—F, the follower plate H between the front and intermediate groups of plates, the follower plate K between said intermediate group and the rear group, and the follower plate L between the rear group and the rear wall 15 of the casing. Each of these follower plates is provided with a peripheral, right angular flange 36, the flanges of the plates G and H extending rearwardly and overhanging the adjacent units F—F of the front and intermediate groups, and the flanges of the plates K and L extending forwardly and overhanging the adjacent units of the intermediate and rear groups.

In assembling the mechanism, the shoes B—B, the rubber cushioning units F—F, and the followers G, H, K, and L are placed within the casing A through the open rear end thereof, and the rear wall 15 applied while the casing is in upright position stood on its front friction shell end, the same being supported on an anvil having an opening therein to accommodate the projecting outer ends of the shoes B—B. In the assembling operation, the shoes are placed within the casing in spread apart condition with the stop flanges 23—23 thereof engaged above and resting on the stop shoulders 20—20. After the parts have been thus far assembled, the casing A is inverted, that is, stood on its closed rear end. While in this position, the rubber elements C—C and the wedge plates E—E are placed in position within the pockets 21—21 of the shoes B—B, by passing the same downwardly between the shoes and then moving them laterally into position within said pockets. The wedge D is then engaged between the shoes, as shown in Figure 4, and forced rearwardly to the position shown in Figure 3, thus spreading the wedge plates E—E apart and placing the rubber elements C—C under initial compression. As will be evident, when the wedge D is brought to the position shown in Figure 2, it is locked against outward displacement with respect to the plates E—E by shouldered engagement therewith.

Upon compression of the mechanism in service, the shoes B—B are forced inwardly of the casing along the friction surfaces 19—19 thereof, opposed by the column of rubber cushioning units F—F, thereby providing high frictional resistance in addition to rubber cushioning effect. Inasmuch as the rubber elements C—C, which press the shoes against the friction surfaces, are under initial compression, the frictional resistance produced is substantially constant throughout the compression of the mechanism. Upon reduction of the actuating pressure, the expansive action of the rubber units F—F restores the parts to the normal position shown in Figures 2 and 3, outward movement of the shoes being arrested by engagement of the flanges 23—23 thereof with the shoulders 20—20 of the friction shell section 10 of the casing A.

I claim:

1. In a friction shock absorbing mechanism, the combination with a friction casing having opposed, interior friction surfaces at opposite sides thereof; of a pair of friction shoes in sliding engagement with said friction surfaces; elongated rubber cushioning units extending lengthwise of and bearing on the inner sides of said shoes; lengthwise extending, opposed wedge plates bearing on the inner sides of said units, each of said plates having lengthwise extending, front and rear wedge faces on the inner sides thereof, and a transverse, rearwardly facing shoulder between said wedge faces; a wedge between said wedge plates having sets of front and rear wedge faces on opposite sides thereof correspondingly inclined to and engaging the wedge faces of said plates, and forwardly facing shoulders between said sets of front and rear wedge faces in engagement with the rearwardly facing shoulders of said wedge plates; and yielding cushioning means within the casing engaging said shoes to oppose inward movement thereof.

2. In a friction shock absorbing mechanism, the combination with a friction casing having opposed, interior friction surfaces at opposite sides thereof and rearwardly facing stop shoulders at the rear ends of said friction surfaces; of a pair of friction shoes in sliding engagement with said friction surfaces, said shoes having laterally projecting lugs thereon engaged behind said shoulders; elongated rubber cushioning units extending lengthwise of and bearing on the inner sides of said shoes; lengthwise extending, opposed wedge plates bearing on the inner sides of said units, each of said plates having lengthwise extending, front and rear wedge faces on the inner sides thereof, and a transverse, rearwardly facing shoulder between said wedge faces, said wedge faces of the opposed plates diverging forwardly of the mechanism; a wedge between said wedge plates having sets of front and rear wedge faces on opposite sides thereof correspondingly inclined to and engaging the wedge faces of said plates, and forwardly facing shoulders between said sets of front and rear wedge faces in engagement with the rearwardly facing shoulders of said wedge plates; and yielding cushioning means within the casing engaging said shoes to oppose inward movement thereof.

3. In a friction shock absorbing mechanism; a casing having an open end; opposed interior friction surfaces at the opposite sides of the casing extending inwardly from the open end thereof and disposed parallel to the axis of the casing; a pair of friction shoes in sliding engagement with said friction surfaces; rubber pads bearing on the inner sides of said shoes; spreading means interposed between said pads and compressing the same to impose pressure between the shoes and friction surfaces, which pressure remains constant as the shoes slide over the surfaces; means for locking said spreading means between said pads to maintain said pressure; and yielding means within the casing engaging said shoes to oppose inward movement thereof.

References Cited in the file of this patent

UNITED STATES PATENTS

| | | |
|---|---|---|
| 943,314 | McKeen | Dec. 14, 1909 |
| 964,173 | Lowry | July 12, 1910 |
| 1,396,896 | Symons | Nov. 15, 1921 |
| 1,738,020 | Richards | Dec. 3, 1929 |
| 1,809,908 | Olander | June 16, 1931 |
| 1,840,125 | O'Connor | Jan. 5, 1932 |
| 2,141,680 | Barrows | Dec. 27, 1938 |
| 2,392,028 | Dath | Jan. 1, 1946 |
| 2,481,575 | Dath | Sept. 13, 1949 |
| 2,536,264 | Danielson | Jan. 2, 1951 |